Feb. 2, 1960   M. G. LOVINGGOOD ET AL   2,923,023
COMBINATION DUST PAN AND TRASH RECEPTACLE
Filed Sept. 18, 1958
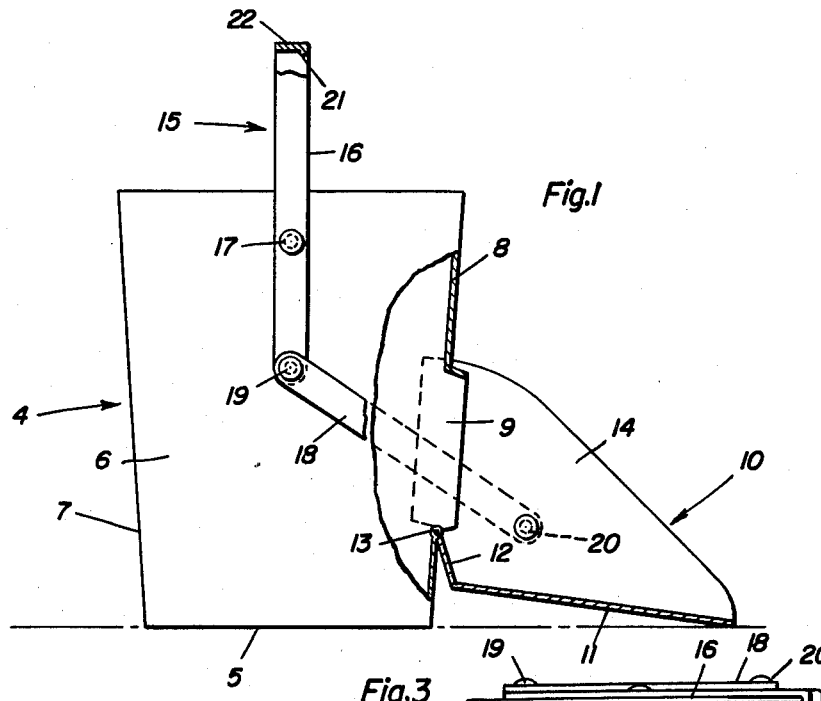
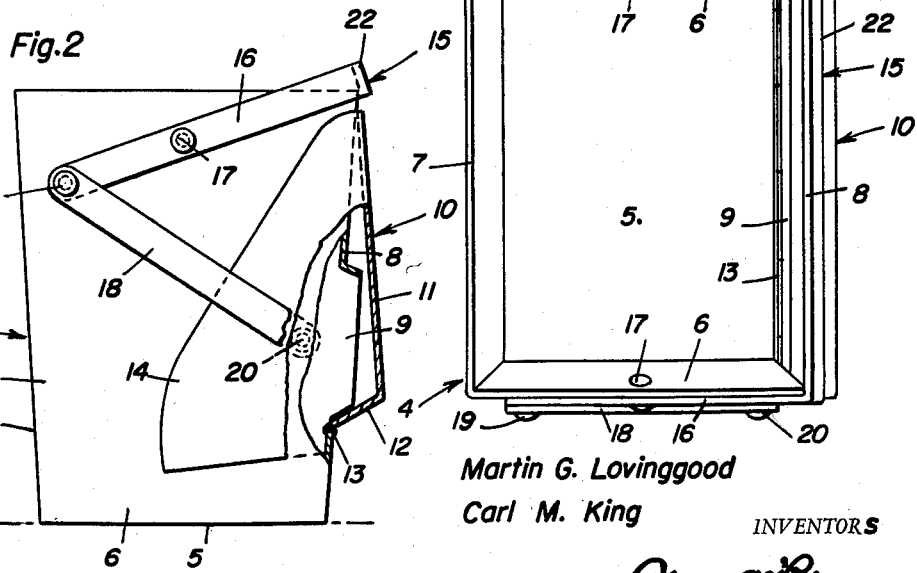
Martin G. Lovinggood
Carl M. King
INVENTORS

United States Patent Office 2,923,023
Patented Feb. 2, 1960

2,923,023

COMBINATION DUST PAN AND TRASH RECEPTACLE

Martin G. Lovinggood and Carl M. King, Cathedral City, Calif.

Application September 18, 1958, Serial No. 761,735

1 Claim. (Cl. 15—257.6)

This invention relates to new and useful improvements in dust pan and trash receptacles of the type comprising a pan hingedly mounted for swinging movement in a vertical plane on a receptacle and adapted to deposit the collected dirt, etc., therein, and has for its primary object to provide, in a manner as hereinafter set forth, a combination device of this character comprising novel means for carrying said device from place to place and for actuating the pan.

Other objects of the present invention are to provide a combination dust pan and trash receptacle of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation, with portions broken away in section, of a combination dust pan and trash receptacle constructed in accordance with the present invention, showing the pan in lowered or operative position;

Figure 2 is a view in side elevation substantially similar to Figure 1 but showing the pan in raised or inoperative position; and Figure 3 is a top plan view of the device, Referring now to the drawing in detail, it will be seen that the embodiment of the invention which has been illustrated comprises a tapered, rectangular bucket or pail of suitable material, preferably metal, which is designated generally by reference character 4. The bucket 4, which may also be of any desired capacity or dimensions, is open at its top.

The bucket 4 includes a bottom 5, sides 6, a back 7 and a front 8. Extending across the front 8 of the bucket 4 is an opening 9. The opening 9 is in the lower portion of the front 8 but spaced above the bottom 5 of the bucket 4.

Mounted for vertical swinging movement on the front 8 of the bucket 4 is a pan 10. The pan 10 includes a bottom 11 and a back wall 12 which is secured by a piano hinge 13 on the front wall 8 of the bucket immediately below the opening 9. The pan 10 further includes upwardly and rearwardly extending side flanges 14 which receive the bucket 4 therebetween.

Mounted for forward and rearward swinging movement on the upper portion of the bucket 4 is a bail-type handle 15. The handle 15 straddles the bucket 4 transversely and the legs 16 of said handle are pivotally connected, at an intermediate point, to the upper portions of the side walls 6 of said bucket, as at 17. Links 18 have one end portion pivotally connected at 19 to the free end portions of the legs 16 of the handle 15. The other end portions of the links 18 are pivotally connected at 20 to the side flanges 14 of the pan 10 for operatively connecting the handle 15 to said pan.

It is thought that the use of the device will be readily apparent from a consideration of the foregoing. Briefly, with the pan 10 in lowered or operative position as shown in Figure 1 of the drawing, dirt may be swept into said pan in the usual manner. With the pan 10 thus lowered the handle 15 is in an upright or vertical position to facilitate carrying the device. To swing the pan 10 upwardly to raised position and deposit the dirt in the bucket 4, the handle 15 is swung forwardly and downwardly. When this occurs the links 18 pull the pan 10 upwardly where it covers the opening, as shown in Figure 2 of the drawing. The bucket 4 is also adapted for use as a waste receptacle for the reception of paper, trash, etc. Reference character 21 designates a lug or detent on the bight portion 22 of the handle 15 which may be snapped over the upper edge of the front 8 of the bucket 4 for frictionally securing the handle in the position of Figure 2 of the drawing with the pan 10 in raised position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A combination dust pan trash receptacle comprising: a substantially rectangular bucket open at its top and including a bottom, side walls, a back wall and a front wall, said front wall having an opening therein at an intermediate point, a substantially U-shaped handle transversely straddling the bucket and including legs pivotally secured, at an intermediate point, to said side walls, a vertically swingable pan hingedly mounted on said front wall immediately below the opening and including side flanges embracing the bucket, links having one end portion pivotally connected to the free end portions of the handle legs and their other end portions pivotally connected to said side flanges for swinging the pan upwardly over the opening for covering same when said handle is swung forwardly and downwardly to an out-of-the-way, inoperative position on the bucket for leaving the top of said bucket unobstructed, and a detent on the bight portion of the handle engageable with said front wall for releasably securing said handle in said inoperative position.

References Cited in the file of this patent

UNITED STATES PATENTS

| | | |
|---|---|---|
| 642,412 | Anderson | Jan. 30, 1900 |
| 1,188,677 | Pike | June 27, 1916 |